United States Patent
Gardner et al.

(10) Patent No.: US 9,466,025 B2
(45) Date of Patent: Oct. 11, 2016

(54) METHOD, APPARATUS AND COMPUTER PROGRAM PRODUCT FOR LOADING CONTENT ITEMS

(75) Inventors: Patrick Gardner, Cumming, GA (US); Nupura Kolwalkar, Cumming, GA (US)

(73) Assignee: McKesson Financial Holdings, Hamilton (BM)

( * ) Notice: Subject to any disclaimer, the term of this patent is extended or adjusted under 35 U.S.C. 154(b) by 391 days.

(21) Appl. No.: 12/394,775

(22) Filed: Feb. 27, 2009

(65) Prior Publication Data

US 2010/0223221 A1    Sep. 2, 2010

(51) Int. Cl.
G06F 17/30    (2006.01)
G06N 5/02    (2006.01)
G06F 21/62    (2013.01)
G06F 7/00    (2006.01)

(52) U.S. Cl.
CPC ......... *G06N 5/025* (2013.01); *G06F 17/30091* (2013.01); *G06F 17/30115* (2013.01); *G06F 21/6218* (2013.01); *G06F 2221/2137* (2013.01)

(58) Field of Classification Search
None
See application file for complete search history.

(56) References Cited

U.S. PATENT DOCUMENTS

| | | | |
|---|---|---|---|
| 6,347,376 B1 * | 2/2002 | Attwood | H04L 63/0272 707/999.003 |
| 6,587,849 B1 * | 7/2003 | Mason et al. | |
| 6,678,700 B1 * | 1/2004 | Moore | G06F 17/30233 |
| 2002/0161800 A1 * | 10/2002 | Eld et al. | 707/512 |
| 2003/0002580 A1 * | 1/2003 | Miura et al. | 375/240.02 |
| 2004/0098383 A1 * | 5/2004 | Tabellion et al. | 707/3 |
| 2004/0193911 A1 * | 9/2004 | Kaler et al. | 713/200 |
| 2005/0171977 A1 * | 8/2005 | Osborne et al. | 707/104.1 |
| 2006/0224943 A1 * | 10/2006 | Snyder et al. | 715/501.1 |
| 2010/0094822 A1 * | 4/2010 | Kelapure | 707/705 |

* cited by examiner

*Primary Examiner* — Usmaan Saeed
*Assistant Examiner* — Yu Zhao
(74) *Attorney, Agent, or Firm* — Alston & Bird LLP (57) ABSTRACT

An apparatus for loading content items may include a processor that may be configured to identify at least one rule associated with a type associated with a content item. The processor may further be configured to evaluate at least one attribute associated with the content item against the at least one rule. The processor may also be configured to identify a container based at least in part on the at least one rule, and store the content item in the identified container based at least in part on the evaluation of the at least one attribute against the at least one rule. A corresponding method and computer program product may also be provided.

19 Claims, 6 Drawing Sheets

METHOD, APPARATUS AND COMPUTER PROGRAM PRODUCT FOR LOADING CONTENT ITEMS

TECHNOLOGICAL FIELD

Embodiments of the invention relate generally to content management, and more particularly to methods, computer program products, and apparatuses for loading content items.

BACKGROUND

With the advancement of technology, there has been an expansion with the amount of information or content available to users. Improvements have been made in the flexibility and immediacy of content transfer such as, for example, between various entities (e.g., users) via electronic devices. In this regard, electronic content may be easily stored and/or transferred between electronic devices. With the increasing large amount of electronic content available, the management of electronic content has progressively become more difficult and accordingly, there has been a demand for a mechanism to manage such content.

With the advancement of technology, content management systems (CMS) have been developed to manage the creation, modification, and removal of content from a location where content may be stored. A CMS may also include features such as format management, revision control, indexing, searching, and retrieval of content. For example, a CMS may be utilized by an organization (e.g., as an Enterprise Content Management (ECM)) to capture, store, manage, and control organization-wide content, or otherwise assist in the control of content.

A CMS may include a directory structure with multiple folders. Content may be submitted in one or more folders for storage. In most instances, the storing of content may be performed by a user who manually places the content in a desired folder based on one or more criteria. One content item may be manually stored in one folder while another content item (which may be similar) may be stored in a different folder. In other instances, content is submitted to a content management system directly into work flow queues, which may require access to the content via the workflow.

Although existing technologies may allow the management of content, it is generally desirable to continue improvement of existing technologies.

BRIEF SUMMARY

A method, apparatus and computer program product are therefore provided for loading content items. In particular, a method, apparatus and computer program product are provided according to one embodiment that create a mechanism for enabling an objective and consistent approach for automatically storing content items and thus preventing any subjective variability between users that may make inconsistent or erroneous decisions when storing content items (e.g., users may store storing similar content items or content items with the same attributes in different folders based on the subjectivity of the users). Embodiments of the present invention may receive a request to store a content item with one or more associated attributes (e.g., metadata). The type of the content item may be identified and one or more rules associated with the type of the content item may be retrieved. The one or more attributes associated with the content item may be identified and evaluated against the retrieved rules, wherein the rules may be ordered based on precedence. In some cases, each rule may specify a storage location (e.g., a container) wherein a content item may be stored. As such, if the attributes of the content item are successfully evaluated against a rule, the content item may be automatically stored in the container (e.g., folder) specified by the matched rule. In some examples, the content item may be automatically stored in the container (e.g., folder) specified by the first matched rule. Embodiments of the present invention may enable the automatic storing of each content item in one container (although one container may store one or more content items).

Accordingly, a method, apparatus and computer program product may thus be provided that create a mechanism for enabling an objective approach of storing content items, regardless of their source or point of capture, by employing a rules-based methodology for determining containers in which the content items may be stored. Embodiments of the present invention may thus provide a rules-based engine, that may be user configurable, that may provide monitoring and regulation of the storing of content items in a location for storing content items, such as, for example, a content manager or content management system. Embodiments of the present invention may employ an expression builder that may be user configurable, that may be used to evaluate attributes (e.g., metadata) associated with content items against one or more rules for storing content items. Embodiments of the present invention may also employ a role-based security mechanism to regulate access to the stored content items, which may ensure that the appropriate users access the appropriate content item(s) at the appropriate time. In some embodiments, the rules associated with the type of content item and the role-based security may be defined by a user such as, for example, a system administrator.

In one exemplary embodiment, a method of loading content items is provided. The method may include identifying at least one rule associated with a type associated with a content item. The method may also include evaluating at least one attribute associated with the content item against the at least one rule. The method may further include identifying a container based at least in part on the at least one rule. The method may additionally include storing the content item in the identified container based at least in part on the evaluation of the at least one attribute against the at least one rule.

In another exemplary embodiment, a computer program product for loading content items is provided. The computer program product includes at least one computer-readable storage medium having computer-executable program code instructions stored therein. The computer-executable program code instructions may include program code instructions for identifying at least one rule associated with a type associated with a content item, program code instructions for evaluating, at a content loader, at least one attribute associated with the content item against the at least one rule, program code instructions for identifying a container based at least in part on the at least one rule, and program code instructions for the content item in the identified container based at least in part on the evaluation of the at least one attribute against the at least one rule.

In another exemplary embodiment, an apparatus for loading content items is provided. The apparatus may include a processor that may be configured to identify at least one rule associated with a type associated with a content item. The processor may further be configured to evaluate at least one attribute associated with the content item against the at least one rule. The processor may also be configured to identify a container based at least in part on the at least one rule, and store the content item in the identified container based at least in part on the evaluation of the at least one attribute against the at least one rule. A corresponding method and computer program product may also be provided.

In another exemplary embodiment, an apparatus for loading content items is provided. The apparatus may include means for identifying at least one rule associated with a type associated with a content item, means for evaluating, at a content loader, at least one attribute associated with the content item against the at least one rule, means for identifying a container based at least in part on the at least one rule, and means for storing the content item in the identified container based at least in part on the evaluation of the at least one attribute against the at least one rule.

Embodiments of the invention may provide a method, apparatus and computer program product for employment in a web based, other network or non-network based operating environment in mobile or fixed devices environments. In some situations, embodiments of the present invention may be employed in conjunction with a content manager or content management system, and as such, the content items may be stored in conjunction with content manager or content management system. As a result, for example, device users may enjoy improved capabilities with respect to applications and services accessible via the device, such as for example, an objective and consistent method for automatically storing content items, regardless of their source or the location where the content items may have been collected, and thus prevents any subjective variability between users that may not make consistent decisions regarding the storing of content items.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

DETAILED DESCRIPTION

Embodiments of the present invention will now be described more fully hereinafter with reference to the accompanying drawings, in which some, but not all embodiments of the invention are shown. Indeed, embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "content item," "information" and similar terms may be used interchangeably to refer to data capable of being transmitted, received and/or stored in accordance with embodiments of the present invention, such as, for example, text file, media file, multimedia file, applications, and/or the like. Moreover, the term "exemplary", as used herein, is not provided to convey any qualitative assessment, but instead merely to convey an illustration of an example. The terms "automatic," "automatically," "automated" or the like may be used interchangeably to refer to an action or operation requiring no user intervention. Additionally, the term "loading" and "filing" may be used interchangeably to refer to storing a content item in a storage location such as, for example, a container (e.g., a folder). Thus, use of any such terms should not be taken to limit the spirit and scope of embodiments of the present invention.

Figure 5:
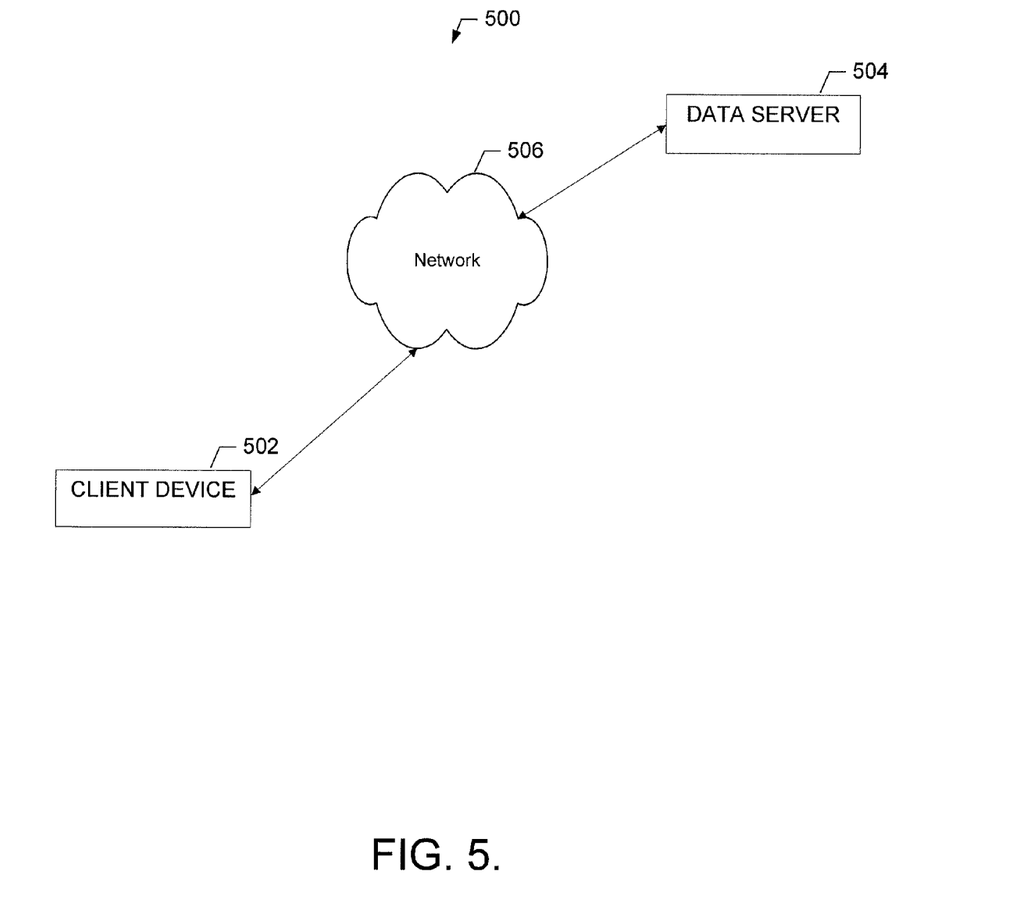
FIG. 5 illustrates a block diagram of a system for loading content items according to an exemplary embodiment of the present invention.

In some situations, embodiments of the present invention may be employed in conjunction with a content manager (e.g., an enterprise content manager) or content management system, and as such, the content items may be stored in conjunction with the content manager or content management system. Embodiments of the present invention may receive a request (e.g., from a user) to store a content item. The content item may be received via various methods for performing content items submissions such as, for example, scanning, faxing, electronic feed (e.g., handwritten documents), drag and drop operations, and/or the like. At an initial stage, a user may define the type of the content item at a point of capture such as, for example, a data server 504 or client device 502 (as illustrated in FIG. 5 and further discussed below), other devices (such as, for example, personal computers, laptops, servers, communication devices (e.g., cellular telephones), personal digital assistants (PDAs), scanners, cameras), and/or the like, which may be used to collect or capture one or more content items and/or metadata. In some instances, the content type may be defined by the user to identify a category of the content item being collected. In some examples, a content type may be used to identify one or more metadata or index values that may be associated with or attributed to the category of the content item. Examples of types of content items may include resume, application, invoice, purchase orders, and/or the like. In some situations, the user may first select a domain and then select a type of content item. In some examples, a domain may correspond to a division or a department within an organization. Examples of domain may include human resources, accounting, information and technology, and/or the like. In some cases, one or more types of content items may be associated with a domain. For example, a human resources domain may include resumes and applications as types of content items, while an information technology domain may include service orders as a content type. In some examples, the user may also define one or more attributes (e.g., metadata) associated with the content item. The metadata may be used as index values to store and retrieve the content item. The point of capture may be manual (e.g., user driven) or automated, and may include one or more or a combination of scanning and faxing, Computer Output to Laser Disc/Electronic Reports Management (COLD/ERM), drag and drop operations, and/or the like.

Upon receiving the content item, the type of the content item may be identified and one or more rules associated with the type of the content item may be identified and/or retrieved (e.g., each type of content item may include one or more rules). In some examples, each rule may designate a container (e.g., folder) wherein one or more content items may be stored. Each rule may include one or more conditions or criteria based at least in part on one or more attributes associated with the content items on the containers designated by the rules. The retrieved rules may be arranged in various orders such as, for example, in an order of precedence (e.g., based on the conditions associated with the rules). For example, the retrieved rules may be ordered by precedence from most restrictive (e.g., most conditions or criteria) to least restrictive (e.g., least conditions or criteria). The one or more attributes associated with the content item may be identified and evaluated against the retrieved rules arranged in an order of precedence. In some examples, the attributes associated with the content items may be evaluated against one or more conditions associated with the rule. For example, the value of one or more attributes may be compared with one or more conditions of a rule. As such, if the attributes of the content item are successfully evaluated against a rule (e.g., a match between the attributes and the conditions), the content item may be automatically stored in the container designated by the matched rule. In some examples, the matched rule may be the first rule against which the attributes of the content item are successfully evaluated. In this regard, the content item may be automatically stored in the container (e.g., a physical location) specified by the matched rule. In some examples, one or more attributes (e.g., a value of the attribute) associated with the content item may be modified before, after, or during the storing the content item based at least in part on the matched rule.

Accordingly, errors in storing or filing content items may be reduced or eradicated. Embodiments of the present invention may ensure that each content item is stored in one appropriate container (although one container may store one or more content items). Embodiments of the present invention may provide an objective and consistent method for automatically storing content items, regardless of the location (e.g., any location associated with the organization) where the content items may have been collected, and thus prevents any subjective variability between users that may not make consistent decisions regarding the storing of content items.

Other aspects of the present invention may include accessing the stored content items, performing actions on the content items, and/or the like based at least in part on defined role-based security associated with one or more containers. In this regard, one or more roles may be assigned to one or more containers based at least in part on the attributes associated with the content items stored in the containers. As such, for example, a role associated with a container may correspond to the rule associated with the container. In some examples, the roles may determine one or more actions that may be performed on the stored content items such as, for example, accessing, retrieving, executing, modifying, deleting, and/or the like. In some examples, one or more roles may be assigned to a user. Accordingly, for example, embodiments of the present invention may receive a request (e.g., from a user) to perform a search for one or more content items based at least in part on one or more attributes associated with the content items. The content items matching the search criteria submitted by the user may be stored in one or more containers. For each container, the role associated with the container may be evaluated against the role associated with the user to determine what, if any, actions may be performed on the content items stored in the container. The results of the search may be returned to the user if the role assigned to the user provides sufficient permission(s) to access and/or perform actions on the returned content items. Embodiments of the present invention may thus also employ a role-based security mechanism to regulate access to the stored content items, which may ensure that the appropriate users access the appropriate content item(s) (e.g., to perform one or more functions) at the appropriate time.

Although exemplary embodiments of the present invention may be described generally with respect to content managers or content management systems, embodiments of the present invention may be equally applicable to other device, means, or system for storing, managing and/or capturing content items, and/or the like.

Figure 1:
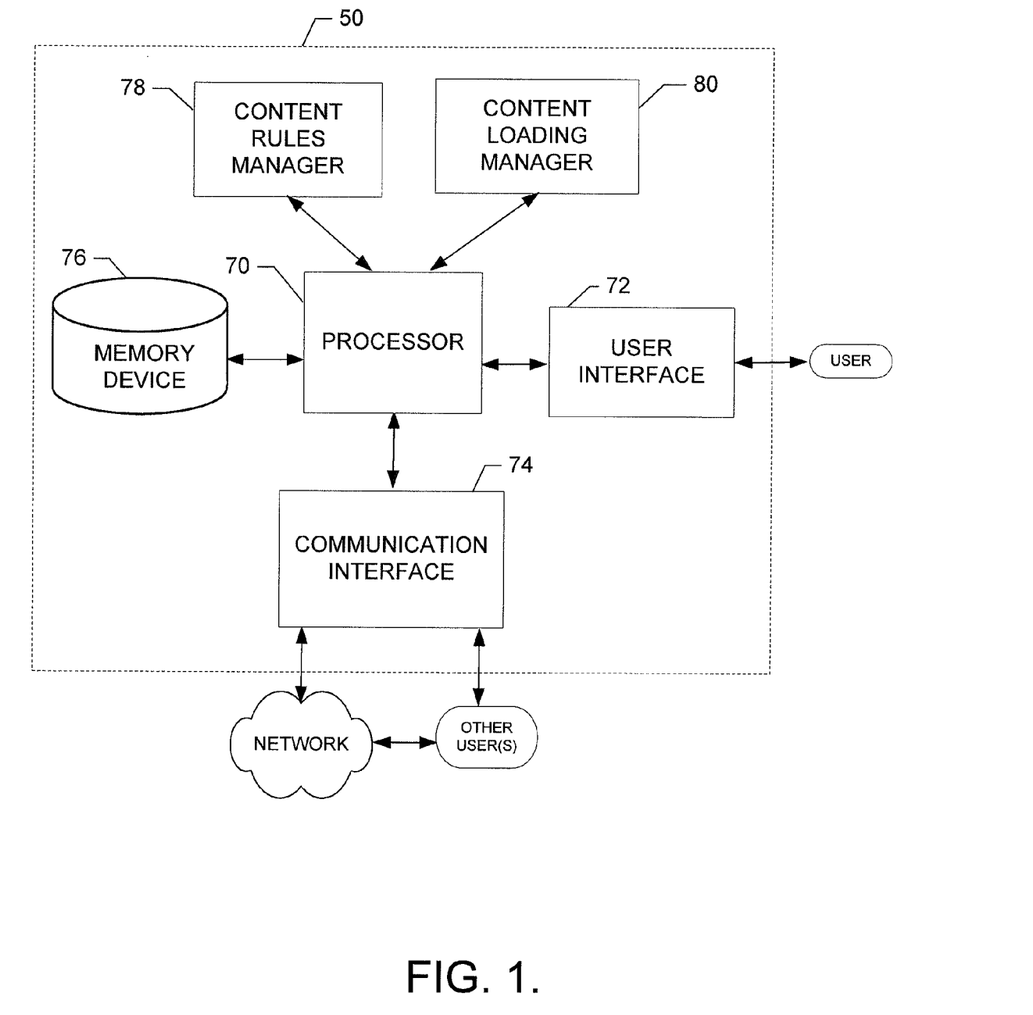
FIG. 1 illustrates a schematic block diagram of an apparatus for loading content items according to an exemplary embodiment of the present invention.

FIG. 1 illustrates a schematic block diagram of an apparatus for enabling the loading of content items according to an exemplary embodiment of the present invention. The apparatus 50 of FIG. 1 may be employed, for example, on the data server 504 or on the client device 502, as illustrated in FIG. 5 and further discussed below. However, the apparatus 50 may alternatively be embodied at a variety of other devices (such as, for example, personal computers, laptops, servers, communication devices (e.g., cellular telephones), personal digital assistants (PDAs), memory devices (e.g., external and/or internal hard disk drives), and/or the like, or any other suitable electronic device). In some cases, embodiments may be employed on a combination of devices. Accordingly, some embodiments of the present invention may be embodied wholly at a single device (e.g., the data server 504 or the client device 502), by a plurality of devices in a distributed fashion (e.g., split between the data server 504 and the client device 502) or by devices in a client/server relationship (e.g., the client device 502 and the data server 504). Furthermore, it should be noted that the devices or elements described below may not be mandatory and thus some may be omitted in certain embodiments. Additionally or alternatively, additional elements could also be added.

Referring now to FIG. 1, an apparatus 50 for loading content items is provided. In some examples, the apparatus 50 may be embodied as one or more content managers or content management systems, or may be employed in conjunction with one or more content managers or content management systems. The apparatus 50 may include or otherwise be in communication with a processor 70, a user interface 72, a communication interface 74 and a memory device 76. The memory device 76 may include, for example, volatile and/or non-volatile memory. The memory device 76 may be configured to store information, data, applications, instructions or the like for enabling the apparatus to carry out various functions in accordance with exemplary embodiments of the present invention. For example, the memory device 76 could be configured to buffer input data for processing by the processor 70. Additionally or alternatively, the memory device 76 could be configured to store instructions for execution by the processor 70.

The memory device 76 may comprise one or more databases that may store information in the form of static and/or dynamic information. The memory device 76 may store, for example, operating logic for applications, as well as content items such as, for example, text files, media files, multimedia files, applications, and/or the like. The memory device 76 may additionally or alternatively store content items, such as may be locally created and/or received from a remote device, such as from the data server 504 or the client device 502. In some embodiments, memory device 76 may store one or more databases that may store various information such as, for example, one or more content items, content item types, rules associated with each content type, users, roles associated with the containers and the users, attribute templates associated with each content type, and/or the like. The memory device 76 may also comprise a file system, which file system may include a directory structure comprising one or more containers (e.g., folders) that may be capable of storing one or more content item. The memory device 76 may be located locally with respect to the apparatus 50, or located remotely from the apparatus 50 and thus remotely accessible to the apparatus 50.

The processor 70 may be embodied in a number of different ways. For example, the processor 70 may be embodied as various processing means such as a processing element, a coprocessor, a controller or various other processing devices including integrated circuits such as, for example, an ASIC (application specific integrated circuit), an FPGA (field programmable gate array), a hardware accelerator, or the like. In an exemplary embodiment, the processor 70 may be configured to execute instructions stored in the memory device 76 or otherwise accessible to the processor 70. As such, whether configured by hardware or software methods, or by a combination thereof, the processor 70 may represent an entity capable of performing operations according to embodiments of the present invention while configured accordingly.

Meanwhile, the communication interface 74 may be any means such as a device or circuitry embodied in either hardware, a computer program product, or a combination of hardware and software that is configured to receive and/or transmit data from/to a network and/or any other device or module in communication with the apparatus 50. In this regard, the communication interface 74 may include, for example, an antenna (or multiple antennas) and supporting hardware and/or software for enabling communications with a wireless communication network (e.g., network 44). In fixed environments, the communication interface 74 may alternatively or also support wired communication. As such, the communication interface 74 may include a communication modem and/or other hardware/software for supporting communication via cable, digital subscriber line (DSL), universal serial bus (USB), Ethernet or other mechanisms.

The user interface 72 may be in communication with the processor 70 to receive an indication of a user input at the user interface 72 and/or to provide an audible, visual, mechanical or other output to the user. As such, the user interface 72 may include, for example, a keyboard, a mouse or other scrolling device, a joystick, a display, a touch screen, a microphone, a speaker, or other input/output mechanisms. In an exemplary embodiment in which the apparatus is embodied as a server or some other network devices, the user interface 72 may be limited, remotely located, or eliminated.

In an exemplary embodiment, the processor 70 may be embodied as, include or otherwise control a content rules manager 78 and a content loading manager 80. The content rules manager 78 and the content loading manager 80 may each be any means such as a device or circuitry embodied in hardware, a computer program product or a combination of hardware and software (e.g., processor 70 operating under software control, the processor 70 embodied as an ASIC or FPGA specifically configured to perform the operations described herein, or a combination thereof) that is configured to perform the corresponding functions of the content rules manager 78 and the content loading manager 80, respectively, as described below.

In an exemplary embodiment, any or all of the content rules manager 78 and the content loading manager 80 may include instructions, code, modules, applications and/or circuitry for providing respective portions of analysis and visualization of content items associations. However, it should be noted that code, circuitry and/or instructions associated with the content rules manager 78 and the content loading manager 80 need not necessarily be modular. In some embodiments, communication between the content rules manager 78 and the content loading manager 80 is conducted via the processor 70. However, the content rules manager 78 and the content loading manager 80 are alternatively in direct communication with each other or may have no communication with each other in other embodiments.

Figure 2:
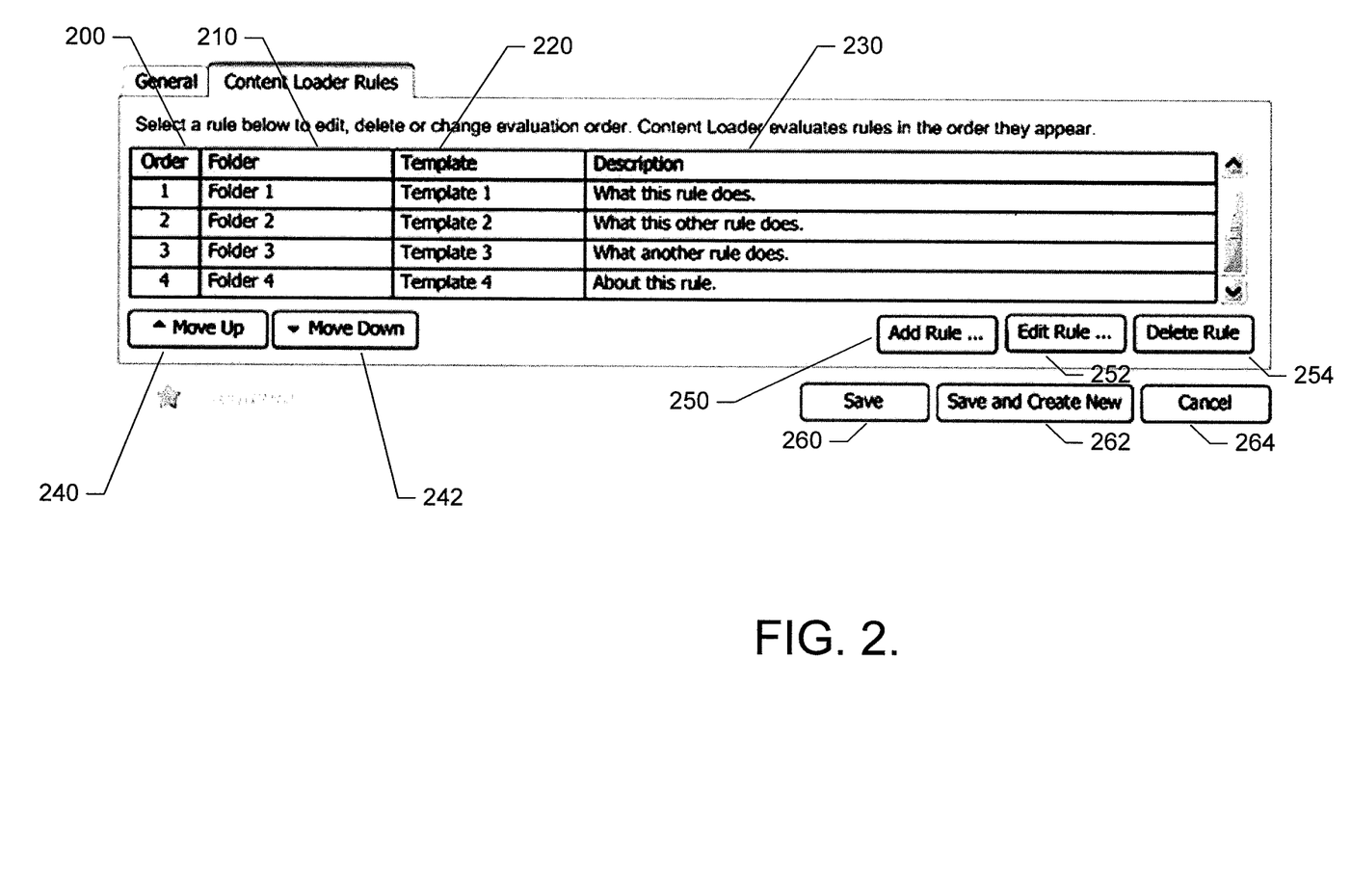
FIGS. 2-4 illustrate example graphical user interfaces according to exemplary embodiments of the present invention.

The content rules manager 78 may be configured to define one or more rules (e.g., rules for loading content items) for each type of content item and associate a rule to one or more containers (e.g., folders). Referring now to FIG. 2, an example graphical user interface (GUI) for managing a list of rules associated with a selected type of content item according to an exemplary embodiment of the present invention is illustrated. The GUI may provide an order section 200 which may indicate the order associated with one or more rules, such as, for example, an order of precedence. For example, the attributes associated with a content item of a type matching the selected type of content item may be evaluated against the rules in the provided order. The order of each rule may be modified with buttons 240-242. In this regard, for example, the order of a rule may be moved up with button 240 or moved down with button 242. The GUI may also provide a folder section 210 which may indicate the container (e.g., folder) wherein the content item successfully evaluated against the rule may be stored. The GUI may also provide a template section 220 which may indicate one or more attributes (e.g., metadata) regularly associated with the type of content item. Additionally, the GUI may provide a description section 230 which may indicate a description (or a portion thereof) of a rule. A new rule may be added with button 250, or an existing rule may be modified or deleted by using buttons 252 or 254 respectively. The configuration of rules (e.g., adjustment of the order of rules) may be saved or cancelled with buttons 260 or 264. Alternatively, the configuration of rules may be saved and one or more rules may be configured for a different type of content with button 262.

Referring back to FIG. 1, the content rules manager 78 may be configured to define one or more conditions for each rule, specify a container wherein one or more content items matching the defined one or more containers may be stored, and/or specify a template. The one or more conditions associated with the rule may be ordered in various orders, such as, for example, from most important to least important. The content rules manager 78 may also be configured to specify a description of the rule and determine an assignment to be performed, for example in conjunction with storing the content items on the container. In this regard, and referring now to FIG. 3, an example GUI for configuring a selected rule according to an exemplary embodiment of the present invention is illustrated. The GUI may include a target folder area 300 where a user may specify a target container for storing content items successfully evaluated against the rule. The GUI may also include a template area 310 where a user may specify a template for the rule (e.g., one or more attributes regularly associated with type of content item). Additionally, the GUI may include a description area 320 where a user may specify a description of the rule. The GUI may include a condition area 330 where a user may specify one or more conditions to be satisfied by one or more attributes of the content item in order to successfully evaluate the content item against the rule. In some examples, a condition may comprise one or more conjunctions, attributes, operators, and values. In some situations, a syntactic validation of the conditions may be performed. The conditions may be arranged in various orders (e.g., from most important to least important) and the order may be modified with buttons 340-342. The GUI may include an assignment area 360 which may indicate one or more attributes of the content item that may be modified when the rule is successfully evaluated.

Figure 4:
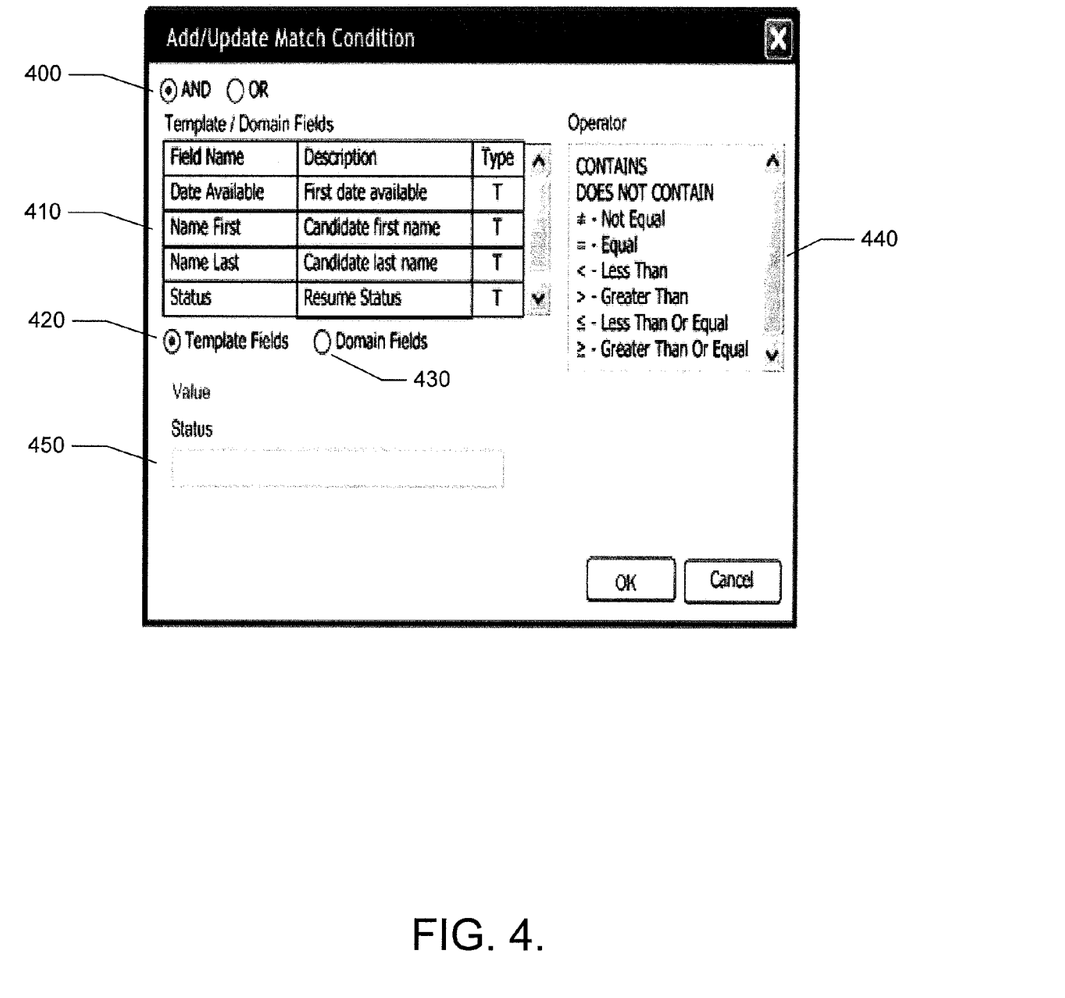

FIG. 4 illustrates a GUI for configuring a condition of a rule according to an exemplary embodiment of the present invention. In some embodiments, the GUI may include or be embodied as an expression builder. The GUI may include a conjunction area 400 and an element area 410. One or more elements may be selected from an element area 410. The element area 410 may display a list of elements associated with a template (e.g., one or more attributes) or associated with domain associated with a content type in response to the selection of a template fields button 420 or domains field button 430 respectively. The GUI may also include an operator area 440 which may include a list of operators. The GUI may include a value area 450 where a user may specify a value for a selected element.

Referring back to FIG. 1, the content rules manager 78 may be configured to generate one or more of the GUIs discussed above. The content rules manager 78 may be configured to define an assignment to be performed in conjunction with the storing of the content item. In this regard, the content rules manager 78 may be configured to specify the modification of a value of one or more attributes associated with the content item being stored. Moreover, the content rules manager 78 may be configured to establish a role-based security mechanism by defining or otherwise specifying and/or assigning one or more roles. The roles may define one or more actions (e.g., accessing, retrieving, modifying, executing, deleting, and/or the like) that may be performed on a content item based at least in part on one or more attributes associated with the content item. The roles may also define one or more content items and/or containers that may be accessible to one or more users. The content rules manager 78 may be configured to assign one or more roles to one or more containers and/or one or more users. For example, the content rules manager 78 may be configured to assign one or more roles to one or more users, the roles providing information regarding one or more containers and/or one or more specific content items that may be accessible by the users and the actions that may be performed by the users on the containers and/or content items. Similarly, the content rules manager 78 may be configured to assign one or more roles to one or more containers, the roles providing information regarding one or more users that may be granted access to the container and/or one or more specific content items, as well as the actions that may be performed on the container and/or the content items.

The content loading manager 80 may be configured to receive one or more requests to store one or more content items and route the content items to the appropriate storage location (e.g., container) to be stored or filed based at least in part on the metadata associated with the content items. The content loading manager 80 may receive content items via various means and/or methods such as, for example, scanning (e.g., of handwritten document), faxing, electronic feed, COLD/ERM, drag and drop operations, and/or the like. The content loading manager 80 may be configured to identify the type of the content item. In some situation, a user may have already identified the type of the content item during a submission process as described herein. The content loading manager may also be configured to identify one or more rules associated with the type of the content item (e.g., by consulting a database which may be embodied as memory device 76) and retrieve the rules associated with the identified content item type (e.g., from the database). The content loading manager 80 may be configured to identify one or more attributes (e.g., metadata) associated with the content item and evaluate the attributes based at in least in part on the retrieved rules to identify or determine a container wherein the content item may be stored. In this regard, the content loading manager 80 may evaluate the content item (e.g., attributes thereof) against the rules in various orders. For example, the content loading manager 80 may evaluate the attributes of the content against the rules in an order of precedence, such as, for example, from the most stringent rule to the least stringent rule. In this regard, and referring to FIG. 2 for example, the attributes of a content item of the type illustrated in FIG. 2 may be evaluated against the rules of the type in the order provided (e.g., rule with order number 1, rule with order number 2, and so forth). If the rules were to be reordered (e.g., by a user), the attributes may be evaluated against the rules in the modified order.

Figure 3:
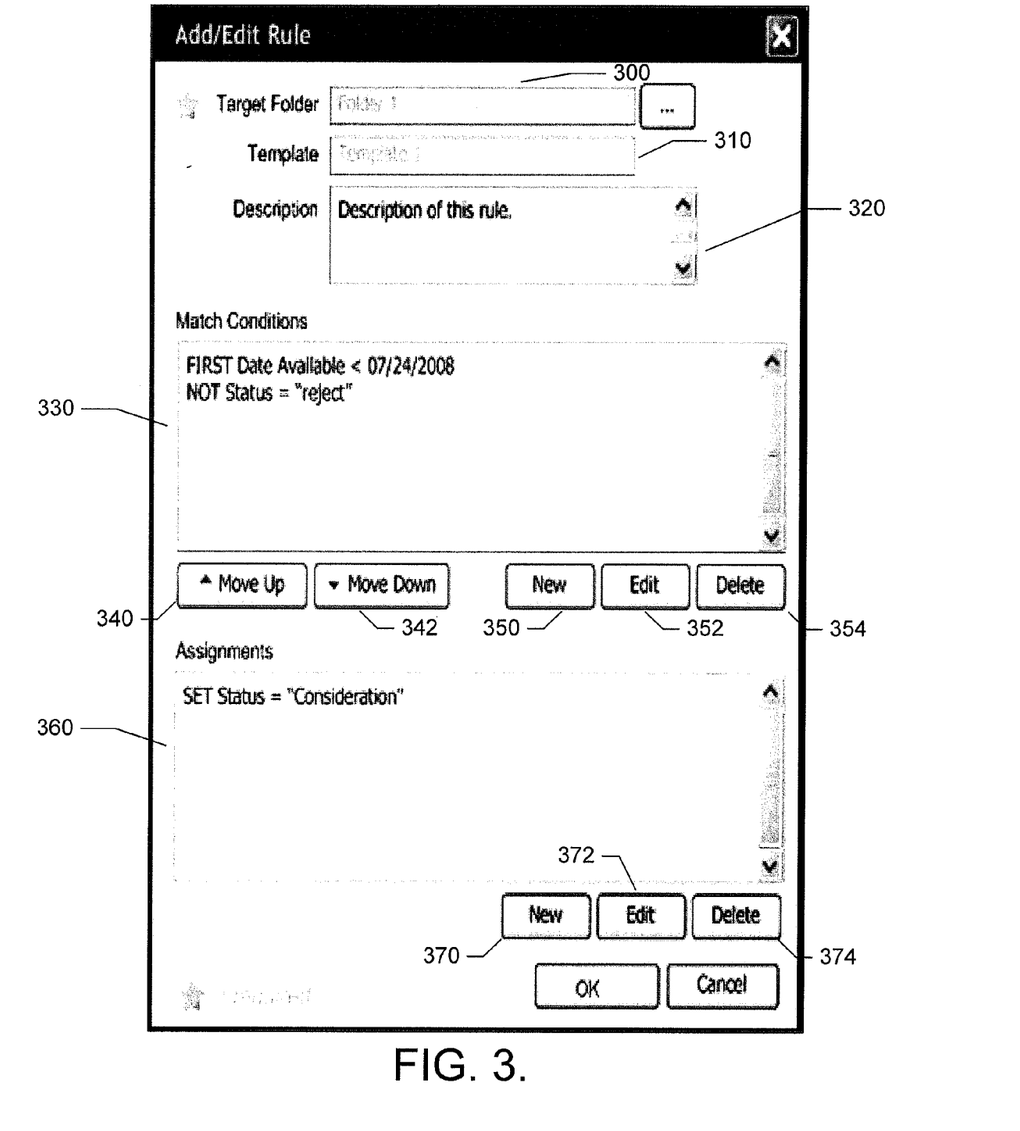

Referring back to FIG. 1, in some embodiments, the content loading manager 80 may be configured to perform the evaluation by comparing one or more attributes of the content item against one or more conditions (or criteria) of one or more rules until a matched rule is determined or identified. For example, the content loading manager 80 may be configured to compare the value of one or more attributes of the content item against one or more conditions of one or more rules. The content loading manager 80 may determine if the attributes of the content item include the attributes specified by one or more conditions of a rule before proceeding to compare the values of the attributes of the content against the corresponding attributes specified by the conditions of the rule. If the attributes of the content item do not include the attributes, the content loading manager 80 may proceed with the following rule. Referring to FIG. 3 for example, if the attributes of the content item include Date Available and Status as specified in conditions section 330, the attributes of the content item may evaluated to determine if the attributes (e.g., values of the attributes) satisfy the specified conditions in the order provided (e.g., Date Available is before "Jul. 24, 2008" and Status is "reject"). In some examples, the evaluation of the conditions may be based at least in part on the order of the conditions. For example, Date Available may first be evaluated, followed by Status. If the attributes of the content item satisfy the specified conditions, the content item (e.g., through its attribute) may be considered successfully evaluated.

Referring back to FIG. 1, if the content item is considered successfully evaluated, the content loading manager 80 may be configured to store the content item in the storage location (e.g., container) designated by the matched rule. As indicated herein, the content item may be stored in the storage location designated by the first rule against which the content item is successfully evaluated. In conjunction with storing the content item, the content loading manager 80 may also be configured to modify one or more attributes designated by the matched rule. Referring again to FIG. 3, for example, the Status attribute of the content item may be set to "Consideration". Referring back to FIG. 1, in some situations, one or more containers may reach their storage capacity. As such, in some embodiments, the content rules manager 78 and/or content loading manager 80 may create one or more additional containers to supplement the one or more containers (e.g., folder) that may have reached their storage capacity. In some examples, the respective rule(s) of parent container(s) may be applied to the child(ren) container(s).

In some examples, the content loading manager 80 may be configured to manage access to the stored content items. In this regard, the content loading manager 80 may receive one or more request to access one or more content items (e.g., via a search request submitted by the user wherein the user may provide, for example, one or more attributes). In this regard, the content loading manager 80 may retrieve one or more roles (e.g., from a database such as memory device 76) associated with one or more containers wherein matching one or more content items may be stored. As indicated herein, the roles associated the containers may be based at least in part on the attributes associated with the content item(s) stored in the containers. The content loading manager 80 may be configured to retrieve the role associated with the user and evaluate the role of the user against the role(s) associated with the container(s). If the role of the user is successfully evaluated against one or more roles associated with one or more containers (e.g., the roles are matching), the user may be granted permission to access the matching content items and/or perform one or more functions specified by the role of the user with respect to the content item(s).

Embodiments of the present invention may thus provide a content loader manager 80 that may be configured so that when a content item is received, it automatically evaluates the attributes of the content item against the content loader rules to determine where (e.g., which container) the content item needs to be stored in, or in other words, the storage location of the content item. Content items may thus be automatically routed to one or more appropriate containers based at least in part on one or more predetermined rules (e.g., content loading rules). As such, the subjectivity of a user in determining where to store the content item may be eliminated and instead content loading rules may be used in conjunction with one or more attributes of the content items to objectively make the determination of where to store the content item and automatically store the content item. Accordingly, embodiments of the present invention may provide an evaluation of user defined attributes associated with a content item to determine the logical storage location for that content item, which attributes may be defined at a point of capture. To this end, embodiments of the present invention may use defined rules to govern a storage location (e.g., within a content manager or content management system) that may be accessed by a plurality of users while also providing a security layer for all users (e.g., users of the content manager or content management system).

FIG. 5 illustrates a block diagram of a system 500 for loading content items according to an exemplary embodiment of the present invention. It will be appreciated that the scope of the invention encompasses many potential embodiments in addition to those illustrated and described herein. As such, while FIG. 5 illustrates one example of a configuration of a system for loading content items, numerous other configurations may also be used to implement embodiments of the present invention. The system 500 may include a client device 502 and data server 504 configured to communicate over a network 506. As such, content items may be transferred between the client device and the data server. In other words, the data server 504 may send content items to and receive content items from the client device 502, and vice versa. For example, the client device 502 may send a request to the data server 504 to store a content item, and the data server may 504 may process the request as discussed above. The client device 502 may be embodied as any computing device, mobile or fixed, and may be embodied as a server, desktop computer, laptop computer, mobile terminal, and/or the like configured to communicate with the data server 504 over the network 506. The data server 504 may be embodied as any computing device or plurality of computing devices configured to provide (e.g., for display), store, and/or modify content items in response to one or more client device 502 requests over a network 506. In this regard, the data server 504 may be embodied, for example, as a server cluster, rack of blade servers, and/or may be embodied as a distributed computing system, such as may be distributed across a plurality of computing devices. In some embodiments, the data server 504 may be a web server. Although referred to herein as a "server," it will be appreciated that the data server 504 may be embodied as a computing device other than a server. Further, although only a single client device 502 and data server 504 are illustrated in FIG. 5, the system 100 may comprise a plurality of client devices 502 and data servers 504.

The network 506 may comprise any network over which the client device 502 and data server 504 may be configured to communicate. Accordingly, the network 506 may comprise one or more public and/or private wireless networks, wireline networks, or any combination thereof, and in some embodiments may comprise the Internet. The network 506 may further comprise a structured network, ad hoc network, or some combination thereof. The network 506 may further utilize any communications protocol or combination of communications protocols that may facilitate inter-device communication between the client device 502 and data server 504. In turn, other devices such as processing elements (e.g., personal computers, server computers, and/or the like) may be coupled to the client device 502 and/or the data server 504 via the network 506. By directly or indirectly connecting the client device 502 and/or the data server 504, and other devices to the network 506, the client device 502 and/or the data server 504 may be enabled to communicate with the other devices, for example, according to numerous communication protocols including Hypertext Transfer Protocol (HTTP) and/or the like, to thereby carry out various communication or other functions of the client device 502 and/or the data server 504.

In some embodiments, the data server 504 may be embodied as apparatus 50 and/or operate as or include a content manager or content management system. In some examples, the data server 504 may manage content for an entire organization such as, for example, a healthcare related institution (e.g., ambulatory care institution, acute care facility, community hospital, and/or the like). One or more client devices may be in communication with the data server 504. The client devices 502 may be located in various locations and may be associated with various divisions or departments of the organization (e.g., human resource, accounting, information technology, patient care). Users of the client devices 502 may be personnel of the organization belonging to these various divisions who may use the client devices 502 to submit one or more content items to the data server 504 via various methods for performing content items submissions such as, for example, scanning, faxing, electronic feed (e.g., handwritten documents), COLD/ERM, drag and drop operations, and/or the like. For example, when submitting a content item, a user may first identify the content type that properly describes the content item being submitted. The user may be presented with one or more appropriate metadata that may be required and/or optional for the identified content type and thus enter the required and/or optional metadata. With respect to scanning and faxing, a paper-based content item may be converted to an electronic image or a facsimile and the metadata for the content item may be defined via, for example, user interactions and/or Optical Character Recognition (OCR), and/or the like. With respect to COLD/ERM, the content item may be a report (e.g., patient report, physician notes, human resources report, and/or the like) automatically generated by one or host systems (e.g., data server 504 and/or client device 502). The report may then be automatically submitted to the data server 504 and the metadata may be automatically mined from the report. With respect to drag and drop operations, a user may submit a content item (e.g., locally stored on a client device 502) directly to the data server 504 (e.g., via an interface allowing drag and drop operations with the data server 504). In this regard, the user may then define the metadata via, for example, manual entry of the metadata.

The submitted content items may be evaluated and stored in one or more appropriate containers based on the information (e.g., content type, metadata, and/or the like) submitted by the user, in accordance with embodiments of the present invention. A user (e.g., a system administrator) may configure (e.g., create, modify, delete) one or more rules associated with the types of content items and assign these rules to one or more containers using one or more GUIs discussed above via the client device 502 or the data server 504 (e.g., directly or via some interfacing operations via a client device). In some embodiments, one rule may be assigned to each container. Similarly, a user (e.g., a system administrator) may configure one or more roles and assign the roles to one or more containers and/or one or more users.

As mentioned, different users may store the same content item on different folders (e.g., on a content management system) because of user subjectivity. However, based on the objective criteria of the one or more rules associated with the type of a content item, exemplary embodiments of the present invention may analyze the attributes and other data associated with the content item and always store the content item in the appropriate container, thereby removing any user subjectivity. For example, regarding a content item in the accounting or accounts payable domain, one or more rules may be defined based on one or more vendor name(s), invoice amounts, due dates, and/or the like. The rule may also designate a container where the content item may be stored, the designated container being accessible by different users (e.g., account payable users). In some instances, the invoice amounts may determine the storage location of the content item based on the users who may have access to the storage location. For example, all invoices with amounts exceeding a predetermined value (e.g., $50,000) may be stored in a container that may be accessible to user(s) processing invoices with values exceeding the predetermined value. In this regard, a search for invoices performed by a user processing invoices exceeding the predetermined value may return the invoices with amounts exceeding the predetermined value, based on the security associated with the user (as mentioned above, users may only view or access content items designated by their associated security). Conversely, a search for invoices performed by a user processing invoices not exceeding a predetermined value may return the invoices with amounts not exceeding the predetermined value.

In a further example, containers within the human resources domain may contain content items with sensitive information (e.g., immigration information, social security, direct deposit information, and/or the like). In this regard, a request may be received to file a content item in a container under the human resources domain and the attributes and other data associated with the content item may be identified. A role-based security may be associated with the container to regulate access to the content items stored therein to users based on the security associated with the user. As such, although a first user (e.g., a supervisor) may perform a search for content items relating to another user (e.g., a supervisee), the search may return content items excluding content items that may include the sensitive information (e.g., immigration information, social security, direct deposit information, and/or the like). In some examples, although a user may submit a content item to be stored, and the content item may be automatically stored in a container where the user may not have access to. In some instances, the user may be prompted (e.g., via a message in a pop-up window) about the fact that the storing of the content item in an inaccessible container. As such, a search performed by the user to retrieve the stored content item may not return the content item.

Accordingly, embodiments of the present invention may store content items in appropriate containers based on the attributes and other data associated with the content items. Role-based security regulating access to the content items stored therein may also be associated with the containers. As such, embodiments of the present invention may ensure that the appropriate users access the appropriate content item(s) at the appropriate time, for example by comparing the role-based security associated with one or more containers and/or one or more content items with the security associated with one or more users requesting access to the content items stored in the containers. Although exemplary embodiments of the present invention may be described generally with respect to healthcare industry (e.g., ambulatory care, acute care facilities, community hospitals, and/or the like), other embodiments may be equally applicable to various other industries such as, for example, transportation, education, information, manufacturing industries, and/or the like.

Figure 6:
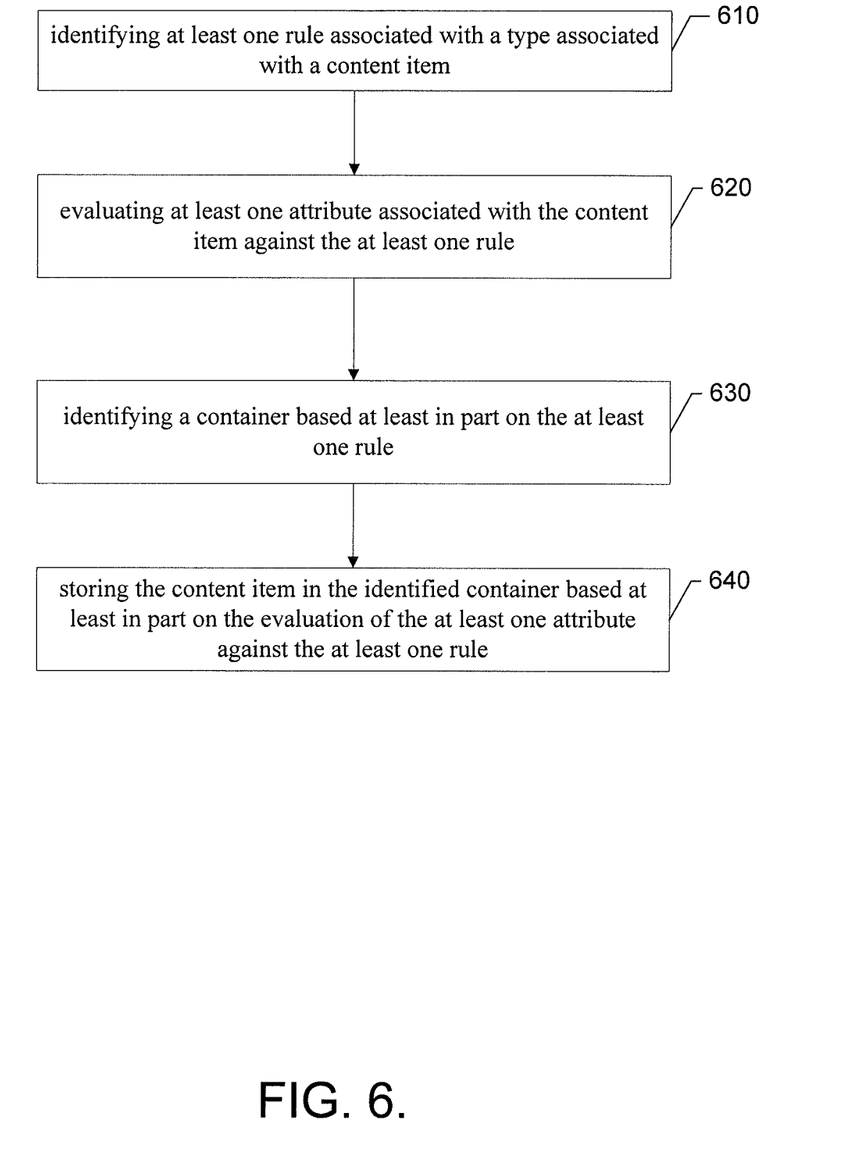
FIG. 6 is a block diagram according to an exemplary method for loading content items according to an exemplary embodiment of the present invention.

FIG. 6 is a flowchart of a system, method and program product according to exemplary embodiments of the invention. It will be understood that each block or step of the flowchart, and combinations of blocks in the flowchart, can be implemented by various means, such as hardware, firmware, and/or software including one or more computer program instructions. For example, one or more of the procedures described above may be embodied by computer program instructions. In this regard, the computer program instructions which embody the procedures described above may be stored by a memory device of the user terminal or network device and executed by a processor in the user terminal or network device. As will be appreciated, any such computer program instructions may be loaded onto a computer or other programmable apparatus (i.e., hardware) to produce a machine, which, in turn, provides means for implementing the functions specified in the flowchart block(s) or step(s). These computer program instructions may also be stored in a computer-readable memory that can direct a computer or other programmable apparatus to function in a particular manner, such that the instructions stored in the computer-readable memory produce an article of manufacture including instructions which implement the function specified in the flowchart block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowchart block(s) or step(s).

Accordingly, blocks or steps of the flowchart support combinations of means for performing the specified functions, combinations of steps for performing the specified functions and program instructions for performing the specified functions. It will also be understood that one or more blocks or steps of the flowchart, and combinations of blocks or steps in the flowchart, can be implemented by special purpose hardware-based computer systems which perform the specified functions or steps, or combinations of special purpose hardware and computer instructions.

In this regard, one embodiment of a method for loading content items as illustrated, for example, in FIG. 6 may include identifying at least one rule associated with a type associated with a content item at operation 610. The method may also include evaluating at least one attribute associated with the content item against the at least one rule at operation 620. The method may further include identifying a container based at least in part on the at least one rule at operation 630. The method may additionally include storing the content item in the identified container based at least in part on the evaluation of the at least one attribute against the at least one rule 640.

In some embodiments, certain ones of the operations above may be modified or further amplified as described below. It should be appreciated that each of the modifications or amplifications below may be included with the operations above either alone or in combination with any others among the features described herein. In this regard, for example, evaluating at least one attribute at operation 620 may include evaluating the at least one attribute against at least one condition specified by the rule. In some embodiments, evaluating at least one attribute at operation 620 may include evaluating the at least one attribute against a plurality of rules in an order of precedence. In some cases, evaluating at least one attribute against a plurality of rules in an order of precedence may include evaluating the at least one attribute against the plurality of rules from a most restrictive rule to a least restrictive rule. In other case cases, storing the content item may include storing the content item in a container identified by a first rule selected from the plurality of rules against which the at least one attribute is successfully evaluated. In some situations, the method may further include receiving a request to store a content item in a container and identifying a type of a content item.

In exemplary embodiments, the method may further include providing a user access to at least one content item stored on a container based at least in part on a role-based security defined based at least in part on at least one attribute associated with content items stored in the container. In some cases, providing a user access may include evaluating a role associated with the user against a role associated with the container.

In an exemplary embodiment, an apparatus for performing the method of FIG. 6 above may comprise a processor (e.g., the processor 70) configured to perform some or each of the operations (610-640) described above. The processor may, for example, be configured to perform the operations (610-640) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 610-640 may comprise, for example, the processor 70 such as a processor executing an algorithm for processing information as described above, the content rules manager 78 and/or the content loading manager 80.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:

identifying a plurality of predetermined rules associated with a type of a content item, wherein each rule includes one or more conditions or criteria and designates a container for storing one or more content items, wherein each type includes one or more rules, and wherein the type of the content item defines a category of the content item;

following identification of the plurality of predetermined rules associated with the type of the content item, evaluating, at a content loader, at least one attribute associated with the content item against at least one rule and identifying a container based at least in part on the at least one rule designating the container, wherein evaluating at least one attribute comprises evaluating the at least one attribute against the plurality of predetermined rules that range from a most restrictive rule to a least restrictive rule by evaluating the at least one attribute against the plurality of predetermined rules in an order of precedence beginning with an evaluation of the at least one attribute against the most restrictive rule and continuing to evaluate the at least one attribute against less restrictive rules in the order of precedence until a predetermined rule is satisfied by the at least one attribute, wherein the most restrictive rule includes a plurality of conditions or criteria, and wherein evaluating the at least one attribute associated with the content item against the most restrictive rule comprises evaluating the at least one attribute associated with the content item against the plurality of conditions or criteria in a predefined order from a most important condition or criteria to a least important condition or criteria; and storing the content item in the identified container based at least in part on satisfaction of the at least one rule with the at least one attribute as a result of the evaluation of the at least one attribute against the plurality of predetermined rules and matching of the at least one attribute associated with the content item with the one or more conditions or criteria of the rule that designates the container, wherein storing the content item comprises storing the content item in a container identified by a predetermined rule that is most stringent from among one or more predetermined rules that are capable of being satisfied by the at least one attribute as represented by a first predetermined rule against which the at least one attribute is successfully evaluated in the order of precedence, wherein the content item is stored in a container identified by a rule that is less stringent than the most restrictive rule in an instance in which the most restrictive rule is not successfully satisfied by the at least one attribute, wherein storing the content item comprises modifying a value of an attribute of the content item being stored based upon the at least one rule that was satisfied.

2. The method of claim 1, wherein evaluating at least one attribute comprises evaluating the at least one attribute against at least one condition specified by the rule.

3. The method of claim 1, further comprising providing a user access to at least one content item stored on a container based at least in part on a role-based security defined based at least in part on at least one attribute associated with content items stored in the container.

4. The method of claim 3, wherein providing a user access comprises evaluating a role associated with the user against a role associated with the container.

5. The method according to claim 1, wherein the one or more conditions or criteria of a respective rule are based at least in part upon one or more attributes, and wherein evaluating at least one attribute comprises:
  determining whether the at least one attribute associated with the content item includes the one or more attributes upon which the respective rule is at least partly based; and
  only in an instance in which the at least one attribute associated with the content item includes the one or more attributes upon which the respective rule is at least partly based, comparing values of the at least one attribute associated with the content item with the one or more conditions or criteria of the respective rule.

6. The method according to claim 1, wherein in an instance in which a container has reached its storage capacity, the method further comprises creating one or more additional containers to supplement the container that has reached its storage capacity and applying one or more rules that were associated with the container that has reached its storage capacity to the one or more additional containers.

7. A computer program product comprising at least one non-transitory computer-readable storage medium having computer-executable program code instructions stored therein, the computer-executable program code instructions comprising:
  program code instructions for identifying a plurality of predetermined rules associated with a type of a content item, wherein each rule includes one or more conditions or criteria and designates a container for storing one or more content items, wherein each type includes one or more rules, and wherein the type of the content item defines a category of the content item;
  program code instructions, following identification of the plurality of predetermined rules associated with the type of the content item, for evaluating at least one attribute associated with the content item against the at least one rule and for identifying a container based at least in part on the at least one rule designating the container, wherein the program code instructions for evaluating at least one attribute comprise program code instructions for evaluating the at least one attribute against the plurality of predetermined rules that range from a most restrictive rule to a least restrictive rule by evaluating the at least one attribute against the plurality of predetermined rules in an order of precedence beginning with an evaluation of the at least one attribute against the most restrictive rule and continuing to evaluate the at least one attribute against less restrictive rules in the order of precedence until a predetermined rule is satisfied by the at least one attribute, wherein the most restrictive rule includes a plurality of conditions or criteria, and wherein the program code instructions for evaluating the at least one attribute associated with the content item against the most restrictive rule comprise program code instructions for evaluating the at least one attribute associated with the content item against the plurality of conditions or criteria in a predefined order from a most important condition or criteria to a least important condition or criteria; and
  program code instructions for storing the content item in the identified container based at least in part on satisfaction of the at least one rule with the at least one attribute as a result of the evaluation of the at least one attribute against the plurality of predetermined rules and matching of the at least one attribute associated with the content item with the one or more conditions or criteria of the rule that designates the container, wherein the program code instructions for storing the content item comprise program code instructions for storing the content item in a container identified by a predetermined rule that is most stringent from among one or more predetermined rules that are capable of being satisfied by the at least one attribute as represented by a first predetermined rule against which the at least one attribute is successfully evaluated in the order of precedence, wherein the content item is stored in a container identified by a rule that is less stringent than the most restrictive rule in an instance in which the most restrictive rule is not successfully satisfied by the at least one attribute,
  wherein the program code instructions for storing the content item comprise program code instructions for modifying a value of an attribute of the content item being stored based upon the at least one rule that was satisfied.

8. The computer program product according to claim 7, wherein program code instructions for evaluating at least one attribute comprises instructions for evaluating the at least one attribute against at least one condition specified by the rule.

9. The computer program product according to claim 7, further comprising program code instructions for providing a user access to at least one content item stored on a container based at least in part on a role-based security defined based at least in part on at least one attribute associated with content items stored in the container.

10. The computer program product according to claim 9, wherein program code instructions for providing a user access comprises instructions for evaluating a role associated with the user against a role associated with the container.

11. The computer program product according to claim 7, wherein in an instance in which a container has reached its storage capacity, the computer-executable program code instructions further comprise program code instructions for creating one or more additional containers to supplement the container that has reached its storage capacity and for applying one or more rules that were associated with the container that has reached its storage capacity to the one or more additional containers.

12. An apparatus comprising:
a processor configured to:
identify a plurality of predetermined rules associated with a type of a content item, wherein each rule includes one or more conditions or criteria and designates a container for storing one or more content items, wherein each type includes one or more rules, and wherein the type of the content item defines a category of the content item;
following identification of the plurality of predetermined rules associated with the type of the content item, evaluate at least one attribute associated with the content item against the at least one rule and identify a container based at least in part on the at least one rule designating the container, wherein evaluating at least one attribute comprises evaluating the at least one attribute against the plurality of predetermined rules that range from a most restrictive rule to a least restrictive rule by evaluating the at least one attribute against the plurality of predetermined rules in an order of precedence beginning with an evaluation of the at least one attribute against the most restrictive rule and continuing to evaluate the at least one attribute against less restrictive rules in the order of precedence until a predetermined rule is satisfied by the at least one attribute, wherein the most restrictive rule includes a plurality of conditions or criteria, and wherein the processor is configured to evaluate the at least one attribute associated with the content item against the most restrictive rule by evaluating the at least one attribute associated with the content item against the plurality of conditions or criteria in a predefined order from a most important condition or criteria to a least important condition or criteria; and
store the content item in the identified container based at least in part on satisfaction of the at least one rule with the at least one attribute as a result of the evaluation of the at least one attribute against the plurality of predetermined rules and matching of the at least one attribute associated with the content item with the one or more conditions or criteria of the rule that designates the container, wherein storing the content item comprises storing the content item in a container identified by a predetermined rule that is most stringent from among one or more predetermined rules that are capable of being satisfied by the at least one attribute as represented by a first predetermined rule against which the at least one attribute is successfully evaluated in the order of precedence, wherein the content item is stored in a container identified by a rule that is less stringent than the most restrictive rule in an instance in which the most restrictive rule is not successfully satisfied by the at least one attribute,
wherein the processor is configured to store the content item by modifying a value of an attribute of the content item being stored based upon the at least one rule that was satisfied.

13. The apparatus according to claim 12, wherein the processor is further configured to evaluate at least one attribute by evaluating the at least one attribute against at least one condition specified by the rule.

14. The apparatus according to claim 12, wherein the processor is further configured to provide a user access to at least one content item stored on a container based at least in part on a role-based security defined based at least in part on at least one attribute associated with content items stored in the container.

15. The apparatus according to claim 14, wherein the processor is further configured to provide a user access by evaluating a role associated with the user against a role associated with the container.

16. The apparatus according to claim 12, wherein in an instance in which a container has reached its storage capacity, the processor is further configured to create one or more additional containers to supplement the container that has reached its storage capacity and to apply one or more rules that were associated with the container that has reached its storage capacity to the one or more additional containers.

17. An apparatus comprising:
means for identifying a plurality of predetermined rules associated with a type of a content item, wherein each rule includes one or more conditions or criteria and designates a container for storing one or more content items, wherein each type includes one or more rules, and wherein the type of the content item defines a category of the content item;
means, following identification of the plurality of predetermined rules associated with the type of the content item, for evaluating at least one attribute associated with the content item against the at least one rule and for identifying a container based at least in part on the at least one rule designating the container, wherein the means for evaluating at least one attribute comprise means for evaluating the at least one attribute against the plurality of predetermined rules that range from a most restrictive rule to a least restrictive rule by evaluating the at least one attribute against the plurality of predetermined rules in an order of precedence beginning with an evaluation of the at least one attribute against the most restrictive rule and continuing to evaluate the at least one attribute against less restrictive rules in the order of precedence until a predetermined rule is satisfied by the at least one attribute, wherein the most restrictive rule includes a plurality of conditions or criteria, and wherein the means for evaluating the at least one attribute associated with the content item against the most restrictive rule comprises means for evaluating the at least one attribute associated with the content item against the plurality of conditions or criteria in a predefined order from a most important condition or criteria to a least important condition or criteria; and
means for storing the content item in the identified container based at least in part on satisfaction of the at least one rule with the at least one attribute as a result of the evaluation of the at least one attribute against the plurality of predetermined rules and matching of the at least one attribute associated with the content item with the one or more conditions or criteria of the rule that designates the container, wherein the means for storing the content item comprise means for storing the content item in a container identified by a predetermined rule that is most stringent from among one or more predetermined rules that are capable of being satisfied by the at least one attribute as represented by a first predetermined rule against which the at least one attribute is successfully evaluated in the order of precedence, wherein the content item is stored in a container identified by a rule that is less stringent than the most restrictive rule in an instance in which the most restrictive rule is not successfully satisfied by the at least one attribute, wherein the means for storing the content item comprise means for modifying a value of an attribute of the content item being stored based upon the at least one rule that was satisfied.

18. The apparatus according to claim 17, further comprising means for providing a user access to at least one content item stored on a container based at least in part on a role-based security defined based at least in part on at least one attribute associated with content items stored in the container.

19. The apparatus according to claim 17, wherein in an instance in which a container has reached its storage capacity, the apparatus further comprises means for creating one or more additional containers to supplement the container that has reached its storage capacity and means for applying one or more rules that were associated with the container that has reached its storage capacity to the one or more additional containers.

* * * * *